United States Patent
Axmacher et al.

(10) Patent No.: US 6,523,512 B2
(45) Date of Patent: Feb. 25, 2003

(54) CONTROL UNIT FOR ADJUSTING THE ANGLE OF ROTATION OF A CAMSHAFT

(75) Inventors: Detlef Axmacher, Iserlohn (DE); Dirk Neubauer, Nachrodt-Wiblingwerde (DE)

(73) Assignee: AFT Atlas Fahrzeugtechnik GmbH, Werdohl (DE)

(*) Notice: Subject to any disclaimer, the term of this patent is extended or adjusted under 35 U.S.C. 154(b) by 0 days.

(21) Appl. No.: 09/916,489

(22) Filed: Jul. 26, 2001

(65) Prior Publication Data

US 2002/0017257 A1 Feb. 14, 2002

(30) Foreign Application Priority Data

Aug. 5, 2000 (DE) .......................... 100 38 354

(51) Int. Cl.$^7$ .................................. F01L 1/34
(52) U.S. Cl. ............... 123/90.17; 123/90.15; 123/90.16; 123/90.31; 74/568 R; 464/1; 464/160
(58) Field of Search ............ 123/90.17, 90.15, 123/90.11, 90.12, 90.31, 90.27; 464/1, 2, 160; 74/567, 568 R; F01L 1/34

(56) References Cited

U.S. PATENT DOCUMENTS

| | | | | |
|---|---|---|---|---|
| 4,763,563 A | * | 8/1988 | Ikeda et al. ..................... 92/71 |
| 5,012,778 A | * | 5/1991 | Pitzi ........................... 123/321 |
| 5,311,846 A | * | 5/1994 | Mueller ................... 123/90.17 |
| 5,509,383 A | * | 4/1996 | Kahrs et al. ............. 123/90.12 |
| 5,680,837 A | * | 10/1997 | Pierik ...................... 123/90.17 |
| 5,809,954 A | * | 9/1998 | Devine et al. .............. 123/500 |
| 6,142,060 A | * | 11/2000 | Saito et al. ..................... 92/71 |

FOREIGN PATENT DOCUMENTS

DE 4135378 4/1993

* cited by examiner

Primary Examiner—Thomas Denion
Assistant Examiner—Ching Chang
(74) Attorney, Agent, or Firm—W. F. Fasse; W. G. Fasse

(57) ABSTRACT

An angle of rotation of a camshaft relative to an angle of rotation of a crankshaft in internal combustion engines is adjusted for influencing the control times of a valve operation sequence. A wobble plate mechanism including a wobble drive realizes the adjustment. The wobble plate mechanism is arranged between camshaft and crankshaft, preferably between camshaft and a camshaft wheel.

10 Claims, 4 Drawing Sheets

CONTROL UNIT FOR ADJUSTING THE ANGLE OF ROTATION OF A CAMSHAFT

BACKGROUND OF THE INVENTION

1. Field of the Invention

The present invention relates to a control unit for adjusting the angle of rotation of a camshaft in relation to the angle of rotation of a crankshaft, in an internal combustion engine.

2. Background Information

The present invention relates to a control unit for adjusting the angle of rotation of a camshaft in relation to the angle of rotation of a crankshaft, as is known from DE 41 35 378 for example.

In internal combustion engines, the crankshaft drives one or more camshafts via a primary drive, which is realized as a chain, toothed belt, upright shaft or as a series of gear wheels. To do this, a camshaft wheel, via which the primary drive drives the camshaft, is fixed to each camshaft and is realized corresponding to the primary drive as a pulley wheel or sprocket wheel, for example. This always involves a gear ratio reduction of the angular rotation of the crankshaft, in which 720° angular rotation of the crankshaft is converted into 360° angular rotation of the camshaft.

In order to ensure that the working cycle of the internal combustion engine runs precisely, and to maintain the control times required for exact combustion, the crankshaft, primary drive and camshaft are manufactured to very tight tolerances.

Thus it is advantageous to eliminate the fixed relation between the crankshaft and the camshaft, for example for speed-dependent adaptation of the control times of the valve clearance, and to allow the camshaft to lead or lag the crankshaft. This is achieved in a simple manner by means of a control unit which displaces the camshaft in relation to the camshaft wheel. The combustion chambers of the internal combustion engine are opened and closed correspondingly earlier or later by the valves as the camshaft turns during the working cycle. This provides an opportunity of further improving the running characteristics of the internal combustion engine so as to save fuel and, above all, to reduce exhaust emission.

Such a control unit is known from German Patent Publication DE 41 35 378, corresponding to U.S. Pat. No. 5,311,846 (Müller et al.), wherein the camshaft of an internal combustion engine is displaced in relation to the crankshaft by means of a hydraulic control unit. The hydraulic control unit includes a wobble plate pump which permits controlling the hydraulic pressure required to displace the camshaft.

The disadvantages of a hydraulic control unit lie in the extensive space occupied by the pump arrangement and the hydraulic chamber system, the arrangement's susceptibility to faults, and the relatively high manufacturing costs.

SUMMARY OF THE INVENTION

The object of the invention is to provide a control unit for adjusting the angle of rotation of the camshaft in relation to the angle of rotation of the crankshaft, which requires little space, is inexpensive to manufacture, and which is very safe in operation.

This task is solved in accordance with the invention by the combination of the following features. According to the invention there is provided an apparatus for adjusting an angle of rotation of a crankshaft driving said camshaft, said apparatus comprising a drive transmission (6) between said camshaft and said crankshaft, said drive transmission including at least one transmission wheel (2) for driving said camshaft by said crankshaft, said drive transmission further comprising at least one rotatable wobble plate (3) and a wobble drive (5) for driving said at least one rotatable wobble plate (3), said at least one rotatable wobble plate (3) comprising at least one wobble drive member positioned for driving said transmission wheel in response to an operation of said at least one wobble drive (5) to thereby control a transmission ratio between said camshaft and said crankshaft through said at least one rotatable wobble plate.

In this case, with an internal combustion engine, camshaft and crankshaft are connected to each other via a primary drive which drives the camshaft via a camshaft wheel connected to the camshaft. Here, the wobble plate mechanism is arranged between the camshaft wheel and the camshaft.

A wobble plate is attached to one side of the wobble plate mechanism, an actuator which drives the wobble plate is also arranged on this side.

A further development of the invention provides for the wobble plate on the opposite side to the actuator to have two rotating gear rings. Here, the first gear ring of the wobble plate engages in a gear ring acting on the camshaft wheel, and the second gear ring of the wobble plate engages in a gear ring acting on the camshaft.

An alternative development of the invention provides for a rotating gear ring to be arranged on each side of the wobble plate. Whereby the gear ring on one side of the wobble plate engages with a gear ring acting on the camshaft wheel. The gear ring formed on the other side of the wobble plate engages with a gear ring acting on the camshaft.

The displacement of the angle of rotation of the camshaft in relation to the camshaft wheel results from the intermeshing gear rings of the wobble plate and of the camshaft wheel and/or the intermeshing gear rings of the wobble plate and of the camshaft having different numbers of teeth.

In the above described embodiment the wobble plate has an axial angle in relation to the camshaft. The effect of this axial angle is that only an angular segment of the gear rings of the wobble plate engages with the gear rings of the camshaft and the camshaft wheel. The size of the angular segment within which the gear rings intermesh is a function of the axial angle of the wobble plate in relation to the camshaft.

A particular simple embodiment of the invention provides for the actuator to directly drive the wobble plate bearing the gear rings.

An alternative, somewhat more complex, embodiment of the invention provides for the actuator to directly drive a further wobble plate, and the further wobble plate transmits the wobbling motion via connecting rods in sliding bearings to the wobble plate bearing the gear rings.

Means are provided which limit the displacement of the camshaft in relation to the crankshaft to a maximum displacement of the camshaft of ±40 degrees.

In a final development of the invention, means are provided which realize a displacement of the camshaft in relation to the crankshaft of 0 degrees if the actuator fails.

BRIEF DESCRIPTION OF THE DRAWINGS

They show.

In order that the invention may be clearly understood it will now be described, by way of example, with reference to the accompanying drawings, which show.

DESCRIPTION OF PREFERRED EMBODIMENTS AND OF THE BEST MODE OF THE INVENTION

Figure 1:
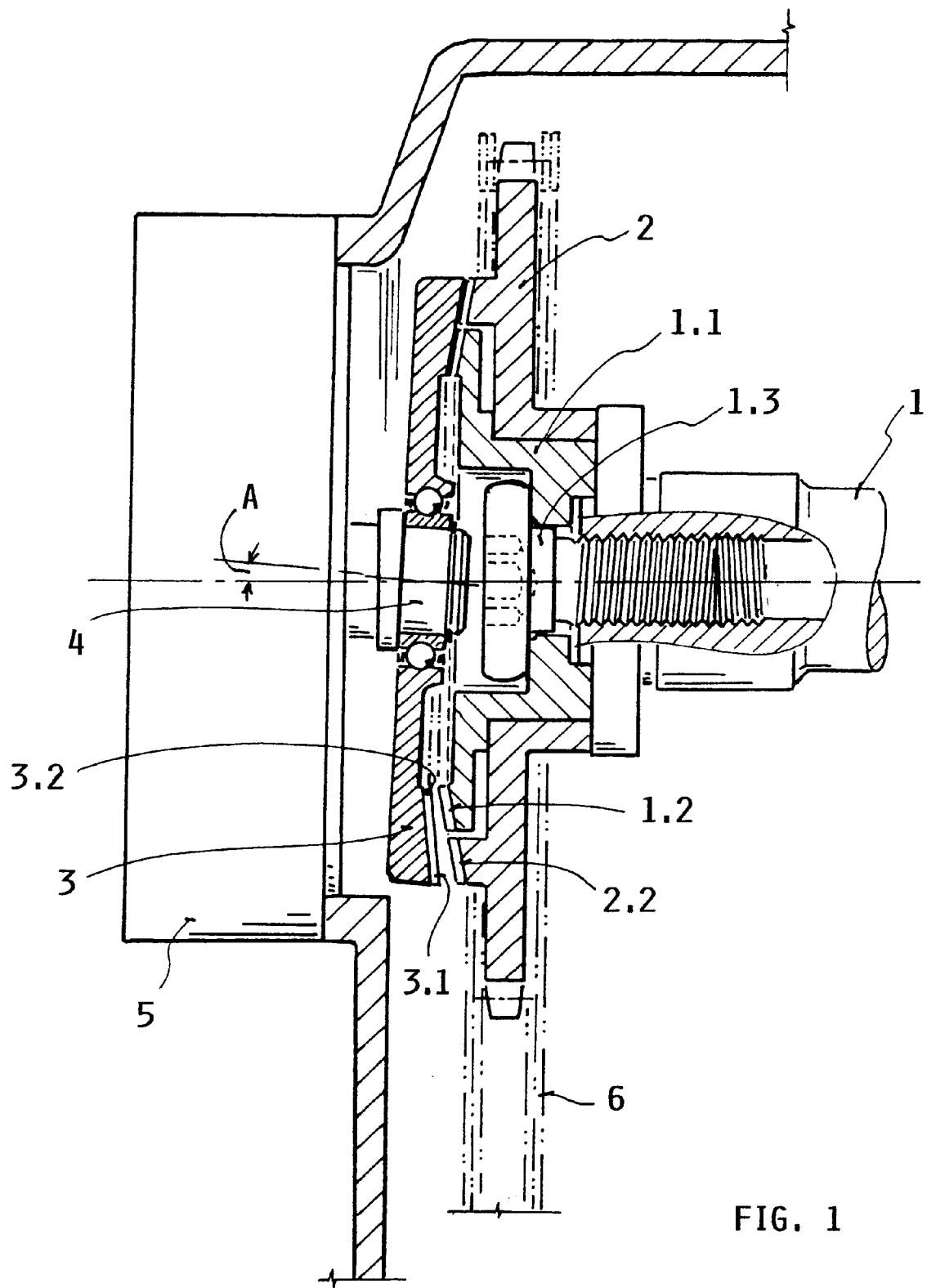
FIG. 1 a sectional drawing through a simply designed control unit realized as a wobble plate mechanism, in which both gear rings are arranged on one side of the wobble plate, FIG. 2 a sectional drawing of an alternative embodiment of the control unit realized as a wobble plate mechanism, in which a gear ring is arranged on each side of the wobble plate.

The principle of operation of a simple wobble plate mechanism is based upon a wobble plate arranged on the drive shaft of an actuating unit, which wobble plate is at an axial angle A to this drive shaft as shown in FIG. 1. The wobble plate is arranged on the drive shaft such that it can rotate relative to the drive shaft.

The wobble plate preferably has two gear rings, each of which engages in a gear ring of a shaft (or a wheel), which thus forms two pairs of gear rings which are meshed with each other. The axial angle A ensures that only the teeth of an angular segment of the pairs of gear rings mesh with each other. The size of the angular sector within which the pairs of gear rings are intermeshed is a function of the axial angle A of the wobble plate in relation to the drive shaft of the actuating unit also referred to herein as wobble drive.

The rotation of the drive shaft of the actuating unit leads to wobbling rotation of the wobble plate, in which the angular segment of the wobble plate meshed with the shafts rotates through 360 degrees during one wobbling revolution. The rotation of the wobble plate itself is a function of how the shafts are driven.

In at least one of the pairs of gear rings, the two intermeshing gear rings have different numbers of teeth. This difference in the number of teeth leads to a displacement between the gear rings during the wobbling rotation of the wobble plate, in which the displacement after one wobbling revolution of the wobble plate corresponds to the angular section taken up by the teeth forming the difference in the number of teeth.

For example, if the wobble plate has a gear ring of double width with 50 teeth which engage a first gear ring, which also has 50 teeth, of a first shaft and which engages a second gear ring, which has 51 teeth, of a second shaft, then one wobbling revolution of the wobble plate leads to an angular displacement between the first shaft (and the actuating unit and the drive shaft) and the second shaft of exactly one tooth (=7.2 degrees). Correspondingly, the displacement between the first shaft and the second shaft is one full revolution after 50 wobbling revolutions of the wobble plate. As a result, the gear ratio between the first shaft and the second shaft, and between the actuating unit or wobble drive of the wobble plate and the second shaft is 50:1 in this example.

If the actuating unit of the wobble plate is at rest, this creates a torque on the second shaft induced by the first shaft via the meshed pairs of gear rings of the shafts and the wobble plate.

Such a wobble plate mechanism can be used very advantageously for influencing the control times for the valve operation sequence of an internal combustion engine, in which the control times are determined by the position of the cams of a camshaft 1 which is driven, for example, by the crankshaft through a camshaft wheel 2.

FIG. 1 shows a sectional drawing of a wobble plate mechanism which connects the camshaft 1 and the camshaft wheel 2, whereby the camshaft wheel 2 is connected to the crankshaft of the internal combustion engine via a primary drive 6 designed as a timing chain.

In this very compact variant, the wobble plate 3 has a double width gear ring 3.1 on the side facing the camshaft 1 and the camshaft wheel 2.

This gear ring 3.1 of the wobble plate 3 engages in a gear ring 2.2 acting on the camshaft wheel 2, which gear ring is formed directly on the camshaft wheel 2.

In addition, the gear ring 3.1 of the wobble plate 3 engages with a gear ring 1.2 acting on the camshaft 1. This gear ring 1.2 which acts on the camshaft 1 is designed as a separate component 1.1, and is connected to the camshaft 1 by means of a screw 1.3 for example. Because of the high friction between the gear rings with the differing numbers of teeth, in this embodiment it is advantageous to provide the outer gear ring of the camshaft wheel 2, which has a larger area, with a number of teeth different from the number of teeth of the wobble plate.

An actuator 5 which drives the wobble plate 3, is arranged on the opposite side of the wobble plate 3 to the gear ring 3.1, said actuator 5 is preferably designed as an electric motor, but it may also be realized as a hydraulic system or a mechanical drive from the internal combustion engine to form the wobble drive.

Figure 2:
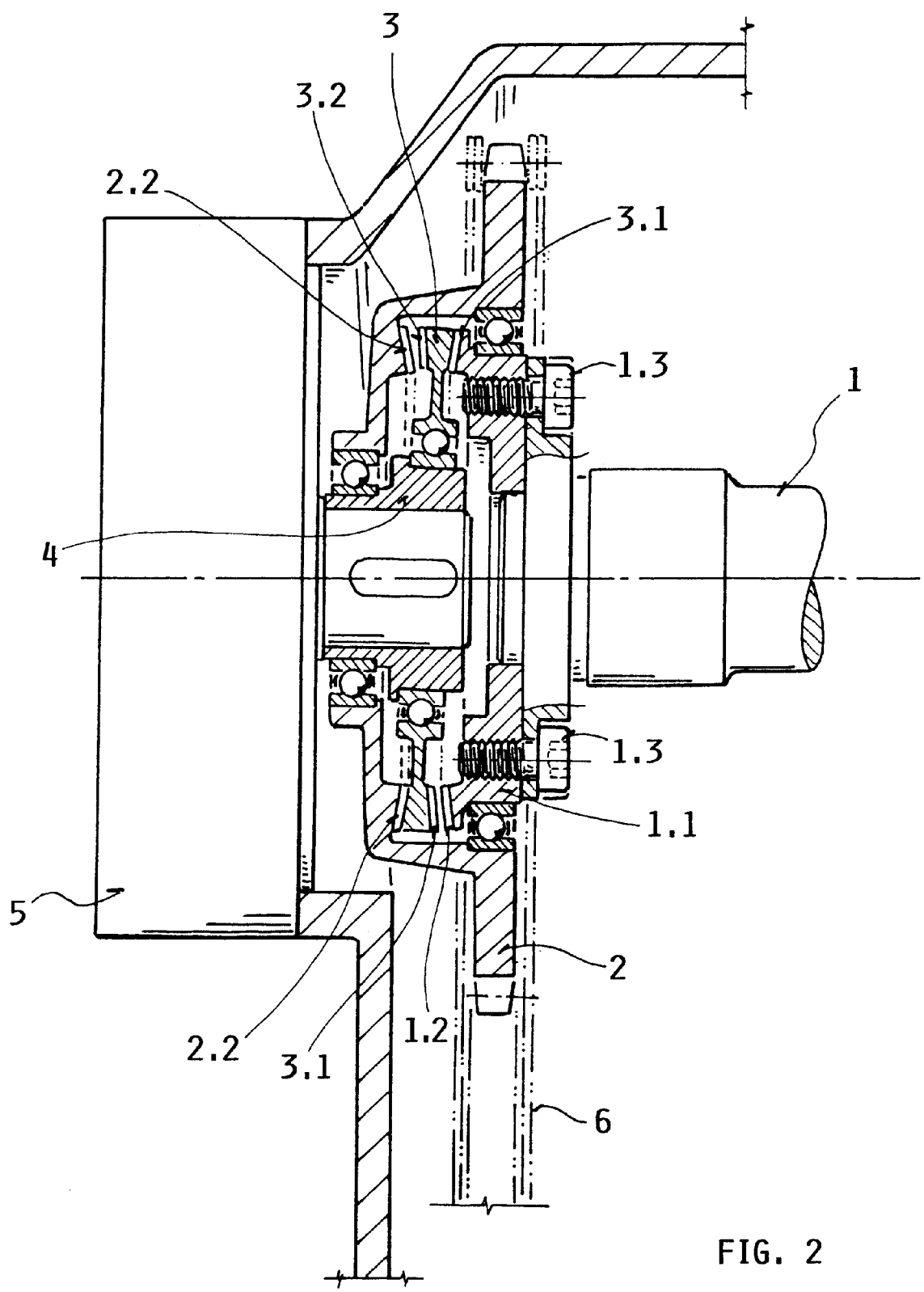

FIG. 2 shows a sectional drawing of an alternative embodiment of a wobble plate mechanism which connects the camshaft 1 and the camshaft wheel 2. A gear ring 3.2 for connecting the gear ring 2.2 of the camshaft wheel 2 is formed on one side of the wobble plate 3, and a gear ring 3.1 for connecting the gear ring 1.2 of the camshaft is formed on the other side of the wobble plate 3. The gear rings 1.2, 2.2, 3.1, 3.2 all have the same diameter, whereby it is irrelevant which two gear rings have the different numbers of teeth. The gear ring 1.2 of the camshaft 1 is again formed on a separately made component 1.1 which is connected to the camshaft by screws 1.3. The camshaft 1 is equipped for this purpose with an appropriate connecting piece for screwing on the formed part 1.1.

When the actuator 5 rotates the drive shaft 4, the wobble plate 3, which has a ball bearing, executes the wobbling rotation, whereby the camshaft 1 opposite the camshaft wheel 2 is displaced according to the gear ratio determined by the numbers of teeth on the gear rings 1.2, 2.2, 3.2, 3.3.

Figure 3:
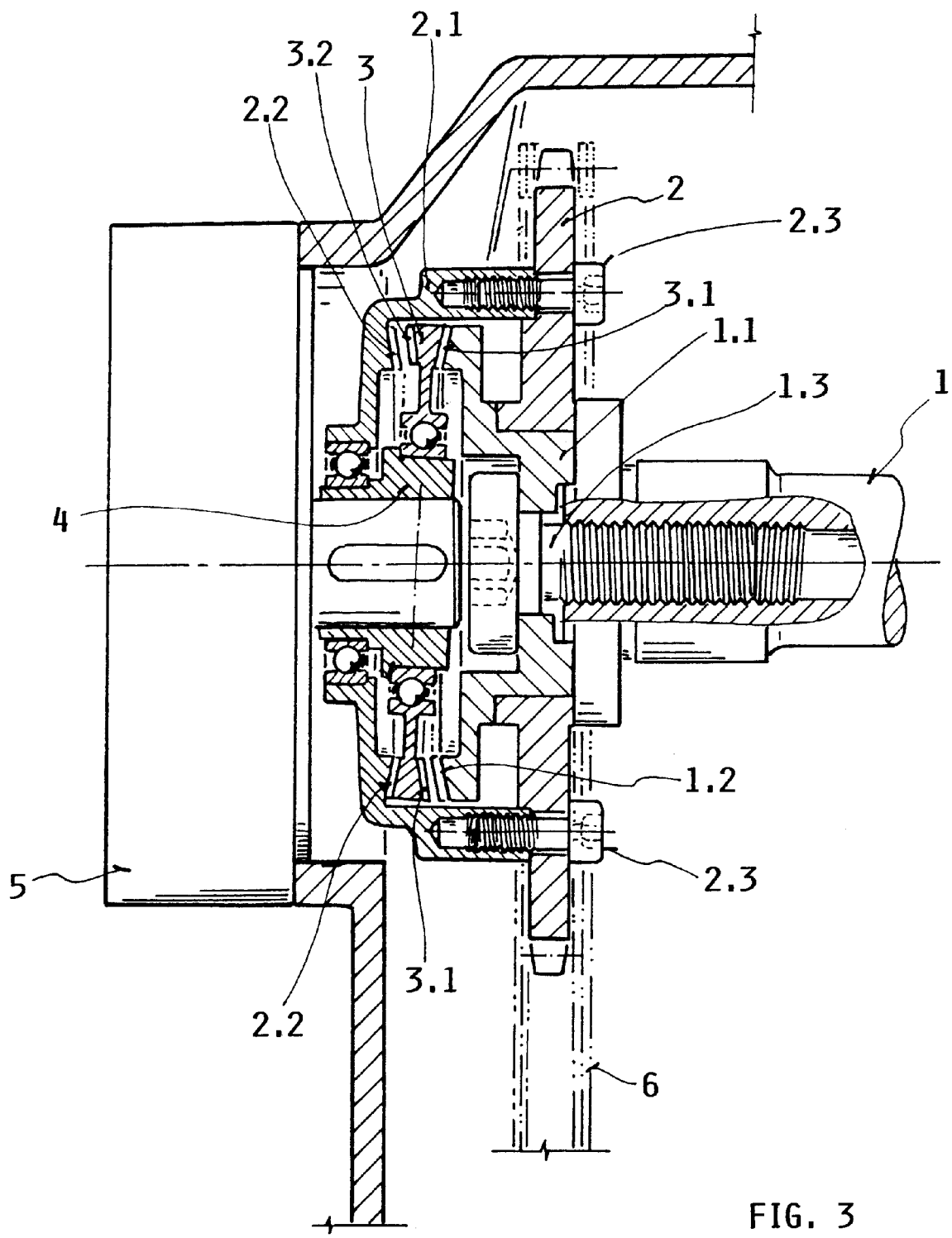
FIG. 3 a sectional drawing of a further alternative embodiment of the control unit realized as a wobble plate mechanism, FIG. 4 the sectional drawing through an alternative embodiment of the control unit realized as a wobble plate mechanism for displacing the camshaft in relation to the camshaft wheel.

FIG. 3 shows a further alternative embodiment of a wobble plate mechanism which connects the camshaft 1 and the camshaft wheel 2. In which, in contrast to FIG. 2, the gear ring 2.2 of the camshaft wheel 2 is designed as a separate component which is screwed onto the camshaft wheel 2 by means of screws 2.3. The separate component 1.1 of the camshaft 1 bearing the gear ring 1.2 is connected to the camshaft 1 by the screw 1.3.

Figure 4:
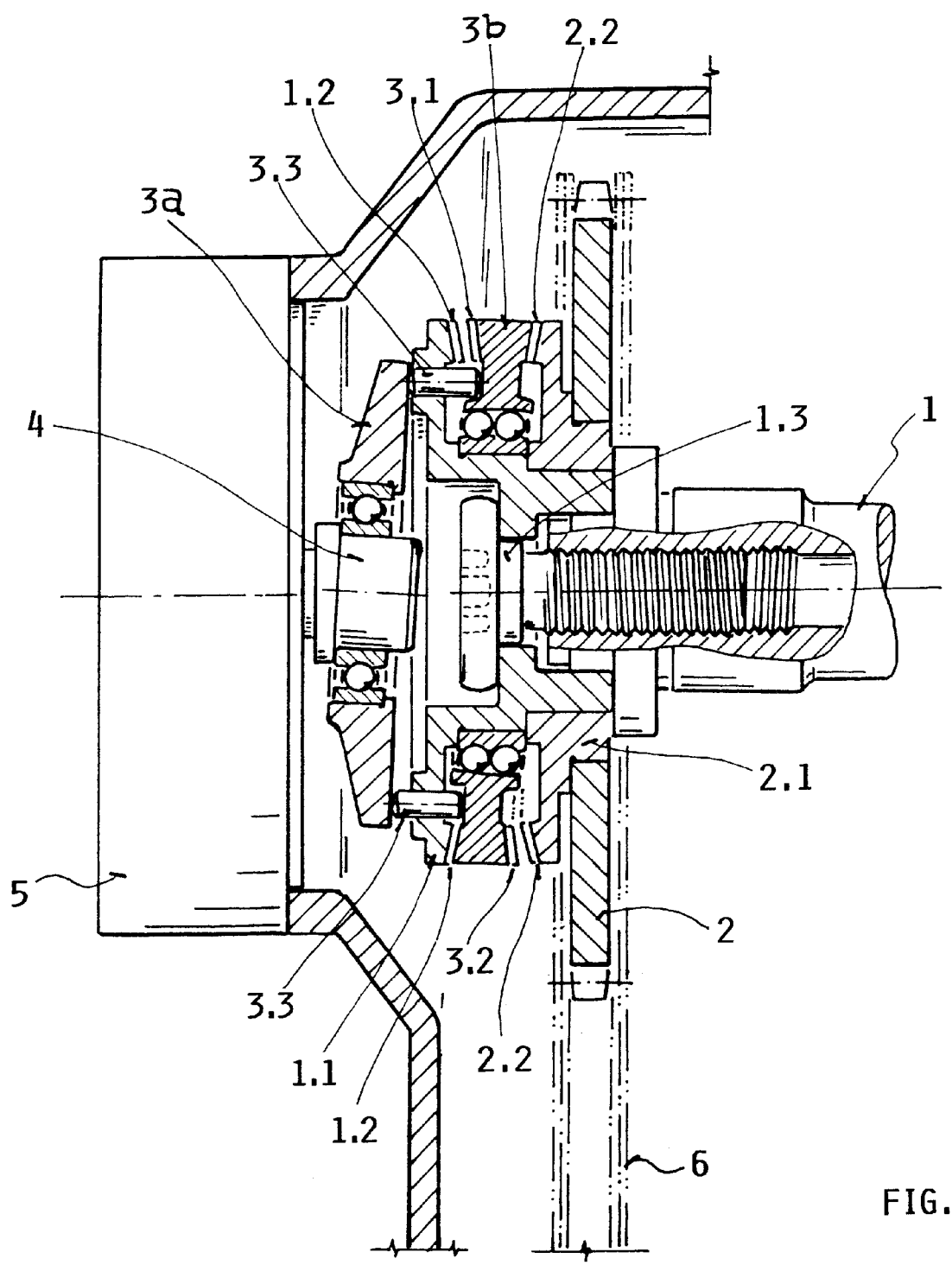

FIG. 4 shows an alternative embodiment of a wobble plate mechanism which connects the camshaft 1 and the camshaft wheel 2, in which the functions to be fulfilled by the wobble plate are divided between a first wobble plate 3a and a second wobble plate 3b.

The wobble plate 3a is arranged on the drive shaft 4 of the actuating unit 5 and does not have any gear rings. The wobble plate 3b thus serves to displace the camshaft 1 and the camshaft wheel 2.

The wobble plate 3b has gear rings 3.1 and 3.2 and is floatingly mounted on a ball bearing in such a manner that the wobble plate 3b is tilted through a plurality of degrees in relation to the axis of the camshaft without axially displacing the fictional center point of the wobble plate 3b. The wobble plate 3b thus serves to connect the camshaft 1 and the camshaft wheel 2.

The rotation of the camshaft 1 would align the wobble plate 3b between the gear ring 1.2 of the camshaft 1 and the gear ring 2.2 of the camshaft wheel 2 as a result of centrifugal forces. However, the wobble plate 3a forces the wobble plate 3b by means of force transmitting rods or pins 3.3 into the position in which the wobble plate 3b connects the camshaft 1 and the camshaft wheel 2 to one another, and in which the camshaft 1 and the camshaft wheel 2 can be displaced in relation to each other by the actuating unit or wobble drive 5.

In principle, the embodiments of the invention shown in FIGS. 1 to 4 enable any degree of displacement of the camshaft 1 in relation to the camshaft wheel 2, and thus in relation to the crankshaft of the internal combustion engine. However, a displacement of the camshaft 1 in relation to the camshaft wheel 2 of just ±40 degrees is useful for influencing the control times for the valve operation sequence of the internal combustion engine. Thus it is useful to provide the wobble plate mechanism with an arrangement which limits the displacement of the camshaft 1 in relation to the camshaft wheel 2.

In order to precisely regulate the mainly speed-dependent, settable control times of the internal combustion engine, the camshaft 1 and crankshaft of the internal combustion engine or the camshaft wheel 2 are equipped with a sensor device which senses the actual position of the camshaft 1 in relation to the camshaft wheel 2, and transmits the signals to a control device that controls the wobble drive 5 of the wobble plate mechanism, in a closed loop manner. The control device compares the actual and set positions of the camshaft 1 and the camshaft wheel 2 with one another, to determine appropriate correction values for controlling the wobble drive if there are deviations. The sensor device may be advantageously realized by non-contact Hall sensors.

Moreover, it is useful to provide an arrangement which ensures that the camshaft 1 and the camshasft wheel 2 are brought into a displacement position of 0 degrees in relation to each other if the wobble drive 5 of the wobble plate 3 fails. The internal combustion engine thus continues to be operated without speed-dependent adaptation of the control times.

The failure of the wobble drive 5 can thus be detected by evaluating the sensor signals of the sensor device.

If it is not possible to bring camshaft 1 and camshaft wheel 2 into a position in which they are displaced by 0 degrees in relation to each other, fuel injection and ignition are adapted according to the displacement of the camshaft in order to ensure the emergency running characteristics.

The control unit designed as a wobble plate mechanism for displacing the angle of rotation of the camshaft in relation to the angle of rotation of a crankshaft takes up little space, especially in the embodiment shown in FIG. 1, it can be manufactured inexpensively, and has high operational safety by means of the emergency running characteristics which can be realized.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for adjusting an angle of rotation of a camshaft relative to an angle of rotation of a crankshaft driving said camshaft, said apparatus comprising a drive transmission (6) between said camshaft and said crankshaft, said drive transmission including at least one transmission wheel (2) for driving said camshaft by said crankshaft, said drive transmission further comprising at least one rotatable wobble plate (3) and a wobble drive (5) for driving said at least one rotatable wobble plate (3), said at least one rotatable wobble plate (3) comprising at least one wobble drive member positioned for driving said transmission wheel in response to an operation of said at least one wobble drive (5) to thereby control a transmission ratio between said camshaft and said crankshaft through said at least one rotatable wobble plate.

2. The apparatus of claim 1, wherein said at least one wobble drive member for said at least one rotatable wobble plate (3) comprises at least one wobble gear ring (3.1), and wherein said at least one transmission wheel (2) of said drive transmission (6) comprises a camshaft wheel for driving said camshaft (1), said camshasft wheel comprising at least one transmission gear ring (2.2) in a position for meshing with said at least one wobble gear ring (3.1).

3. The apparatus of claim 1, wherein said at least one rotatable wobble plate (3) comprises a first side facing said at least one wobble drive (5), a second opposite side facing said at least one transmission wheel, said at least one wobble drive member comprising two wobble gear rings (3.1; 3.2) on said second opposite side facing said at least one drive transmission wheel, said at least one transmission wheel (2) comprising a camshaft wheel connected to said camshaft and including a first transmission gear ring (2.2) positioned for meshing with one of said two wobble gear rings (3.1), said apparatus comprising a further transmission gear ring (1.2) connected (at 1.3) to said camshaft (1) in a position for meshing with the other wobble gear ring (3.2) of said two wobble gear rings (3.1; 3.2).

4. The apparatus of claim 1, wherein said at least one rotatable wobble plate (3) comprises first and second plate sides facing in opposite directions, said at least one wobble drive member comprising a first wobble gear ring (3.1) on said first plate side and a second wobble gear ring (3.2) on said second plate side of said at least one rotatable wobble plate (3), said at least one transmission wheel of said drive transmission comprising a camshaft wheel connected to said camshaft and including a first transmission gear ring (2.2) positioned for meshing with said second wobble gear ring (3.2) facing said at least one wobble drive, and a further transmission gear ring (1.2) connected (at 1.3) to said camshaft (1) in a position for meshing with said first wobble gear ring (3.1).

5. The apparatus of claim 1, wherein said at least one transmission wheel (2) includes a transmission gear ring, and wherein said at least one rotatable wobble plate includes a wobble gear ring, said transmission gear ring and said wobble gear ring each having a different number of teeth.

6. The apparatus of claim 1, wherein said at least one rotatable wobble plate comprises a wobble axis, said camshaft having a rotational camshaft axis, said wobble axis extending at a wobble angle (A) to said camshaft axis, and wherein said at least one transmission wheel (2) and said at least one rotatable wobble plate each comprises a respective gear ring, said gear rings meshing with each other along an angular meshing sector having an angular range depending on a size of said wobble angle (A).

7. The apparatus of claim 1, wherein said wobble drive (5) comprises a wobble drive shaft (4) and a bearing rotatably mounting said at least one wobble plate (3) to said wobble drive shaft (4) of said wobble drive (5).

8. The apparatus of claim 1, wherein said at least one wobble plate (3b) is mounted to said camshaft for rotation and wobbling, said apparatus comprising a further wobble plate (3a) mounted for rotation and wobbling to said wobble drive (5), and wobble pins (3.3) operatively interposed between said first and second wobble plates (3b, 3a) for transmitting a wobbling motion from said second wobble plate (3a) to said first wobble plate (3b).

9. The apparatus of claim 1, further comprising limiting means for limiting an angular displacement of said camshaft to a maximum of ±40°.

10. The apparatus of claim 1, further comprising stop means positioned for preventing any displacement of said camshaft relative to said crankshaft in response to a failure of said wobble drive.

\* \* \* \* \*

UNITED STATES PATENT AND TRADEMARK OFFICE
CERTIFICATE OF CORRECTION

PATENT NO. : 6,523,512 B2  Page 1 of 1
DATED : February 25, 2003
INVENTOR(S) : Detlef Axmacher et al.

It is certified that error appears in the above-identified patent and that said Letters Patent is hereby corrected as shown below:

Column 1,
Line 11, after "Background Information", delete lines 12-15;

Column 2,
Line 62, after "Brief Description of the Drawings", delete "They show:"

Signed and Sealed this

Twenty-second Day of July, 2003

JAMES E. ROGAN
*Director of the United States Patent and Trademark Office*